United States Patent
Pearson

(10) Patent No.: US 7,224,936 B2
(45) Date of Patent: May 29, 2007

(54) PORTABLE COMMUNICATION DEVICE OPERABLE AS A RELAY DEVICE ONLY WHEN CONNECTED TO AN EXTERNAL POWER SOURCE

(75) Inventor: Ian D Pearson, Ipswich (GB)

(73) Assignee: British Telecommunications public limited company, London (GB)

( * ) Notice: Subject to any disclaimer, the term of this patent is extended or adjusted under 35 U.S.C. 154(b) by 323 days.

(21) Appl. No.: 10/472,896

(22) PCT Filed: Mar. 11, 2002

(86) PCT No.: PCT/GB02/01080

§ 371 (c)(1),
(2), (4) Date: Sep. 25, 2003

(87) PCT Pub. No.: WO02/080405

PCT Pub. Date: Oct. 10, 2002

(65) Prior Publication Data

US 2005/0113022 A1    May 26, 2005

(30) Foreign Application Priority Data

Mar. 30, 2001 (GB) .................................. 0108056.3

(51) Int. Cl.
*H04B 7/15* (2006.01)
(52) U.S. Cl. ...................................... 455/11.1; 455/572
(58) Field of Classification Search ............... 455/11.1, 455/445, 518, 574, 343.2, 13.1, 41.2, 564, 455/345, 343.6, 572; 370/338
See application file for complete search history.

(56) References Cited

U.S. PATENT DOCUMENTS

| | | | |
|---|---|---|---|
| 5,771,463 A | 6/1998 | Lehmusto et al. | |
| 5,907,540 A | 5/1999 | Hayashi | |
| 6,055,429 A * | 4/2000 | Lynch | 455/445 |
| 6,323,775 B1 * | 11/2001 | Hansson | 340/636.1 |
| 6,795,688 B1 * | 9/2004 | Plasson et al. | 455/41.2 |

FOREIGN PATENT DOCUMENTS

| | | |
|---|---|---|
| EP | 0689303 A1 | 5/1994 |
| EP | 1079548 A1 | 2/2001 |
| GB | 2291564 A | 1/1996 |
| GB | 2326059 A | 12/1998 |
| GB | 2346511 A | 8/2000 |
| WO | WO 95/11561 | 4/1995 |
| WO | WO 96/22001 | 7/1996 |
| WO | WO 98/39936 | 9/1998 |
| WO | WO 99/46899 | 9/1999 |
| WO | WO 01/47181 A2 | 6/2001 |

OTHER PUBLICATIONS

UMTS Universal Mobile Telecommunications System, TR 101 146 V3.0.0 (Dec. 1997), XP002128289, Technical Report.

* cited by examiner

*Primary Examiner*—Edward Urban
*Assistant Examiner*—Tu X. Nguyen
(74) *Attorney, Agent, or Firm*—Nixon & Vanderhye P.C.

(57) ABSTRACT

A mobile telephone capable of being powered both by an internal power source and by an external power source, includes relay means operable to cause the telephone to relay signals between a base station and another mobile telephone, the relay means being operable only when an external power source is connected and not when it is running off its own internal battery.

20 Claims, 3 Drawing Sheets

PORTABLE COMMUNICATION DEVICE OPERABLE AS A RELAY DEVICE ONLY WHEN CONNECTED TO AN EXTERNAL POWER SOURCE

This application is the US national phase of international application PCT/GB02/01080 filed 11 Mar. 2002 which designated the U.S.

BACKGROUND

1. Technical Field

This invention relates to relay devices for communication systems, and communication systems having such devices.

2. Related Art

In a normal cellular telephone system, a plurality of cellular telephones (also known as cell phones or mobile telephones) normally each communicate with a base station by sending and receiving radio signals to and from the base station.

The base station normally has an antenna mounted on a building or on the ground, whereas cellular telephones are portable and can easily be carried by a user when the user travels from one location to another location. However, cellular telephones can only normally transmit radio signals within a certain range. If the user travels too far from the base station, or to a region where there is an obstacle between the user's cellular telephone and the base station, the radio signal travelling between the base station and the cellular telephone may become too attenuated to reliably convey the original information. Consequently the radio signal will not be properly received. Unless there is another base station within the range of the cellular telephone, the user will not be able to communicate over the cellular telephone.

Networks are known which have a plurality of mobile nodes. A message is conveyed by passing the message from one node to the most adjacent node, and then to the next adjacent node, and so on until the message reaches its destination. Such networks are commonly referred to as "parasitic" networks. Such systems may have a fixed base station, although not all of them do. It is known, for example from United Kingdom Patent Specifications GB2326059 and GB2346511 to use one or more mobile terminals of a cellular radio system to relay traffic between other mobile terminals and the nearest base station, thus reducing the power required by the base station and allowing radio access to places not reachable directly from the base station.

Base stations are usually fitted with directional antennas, to concentrate their signal gain in the azimuthal direction where most mobile terminals are likely to be found, but there is still a falling off of signal strength with distance. However, as portable mobile terminals may be held in any orientation, they require omnidirectional antennas, in which signal strength falls off with distance according to the inverse square law. The use of mobile terminals as relays reduces the power required by the system as a whole. For example, if a hop of length x requires a given transmitter power strength P at the transmitter to generate a received strength E, to provide the same received signal strength E on a hop of length x/3 requires a transmitter power of P/9. Thus, three hops of length x/3 require a total power output of only 3P/9=P/3.

Users of such relay devices incorporated into mobile telephones would therefore benefit from reduced power consumption overall, since although power would be taken from their mobile device to relay calls between other users, they would benefit from reduced power consumption on their own call traffic to a much greater degree. However, most mobile devices are battery powered. The availability of reduced power consumption would be of little consolation to a user who has left his device on standby awaiting a call if, when the call comes through, his battery has already been drained by its use as a relay. It is an object of the present invention to address this issue.

BRIEF SUMMARY

According to one aspect of the invention, there is provided a communication device for a communication system, the device being portable and being operable to transmit and receive wireless signals, wherein the device is operable as a relay device to receive a wireless signal transmitted by a second communication device, and, in response to receiving the wireless signal, to transmit a further wireless signal to a third communication device, the further signal being representative of the information contained in the signal received by the relay device from the second communication device, wherein the device has control means arranged to permit it to be in a relay-operable state, in which state it can relay wireless signals between second and third communication devices, only when the device is connected to an external power source. This may be desirable to a user who is unwilling to allow the battery of his or her relay device to be used to relay calls.

According to another aspect of the invention, there is provided a mobile telephone capable of being powered both by an internal power source and by an external power source, including: relay means operable to cause the telephone to relay signals between a base station and another mobile telephone; means to detect when the telephone is connected to an external power source, and, control means arranged to permit operation of the relay means only when the external power source is connected.

Preferably the internal power source is a rechargeable battery, and the external power source serves also to recharge the battery.

The term "wireless signal" will be understood to include a signal carried by microwaves, radio waves or other electromagnetic radiation, and also ultrasonic transmissions. The second or third communication devices may be other relay-equipped portable devices, portable devices having no relay capability, or fixed base stations.

If the relay device is located such that wireless signals from a second communication device reach the relay device, and wireless signals from the relay device reach a third communication device, the relay device can be used to relay the wireless signal from the second communication device to the third base station. This will reduce the power needed by the communication device to transmit a wireless signal to the base station. Furthermore, because the relay device is portable, a person can easily carry the relay device to a position where it is able to relay the wireless signal to the base station.

If the second or third communication device is also operable to relay calls in the same way as the relay device, a call to or from a further communication device may be relayed in two or more stages.

The invention also extends to a communication system comprising a base station, which may be connected to a public telephone network, and a plurality of communication devices, at least one of which is operable as a relay device in accordance with the invention, wherein a central management system associated with the base station is provided for controlling the state of the relay device(s) on the basis of information accessed from a memory, and wherein the central management has means for updating the information at time intervals, and wherein the information identifies: which relay devices, if any, are within the range of the base station and currently in their relay-operable state; and, which communication devices are within the range of each identified relay-operable device.

A wireless signal initiated by a communication device can be relayed sequentially by a number of chosen relay-operable devices, the chosen relay-operable devices being chosen from a larger number of relay-operable devices which are able to receive the signal directly or indirectly, and wherein the relay-operable devices for relaying the signal, and the order in which the relay-operable devices relay the signal, being selected by the central management. The choice of relay devices and the order in which the relay devices relay a signal is preferably determined by the central management before or when the wireless signal is initiated.

The wireless signals from a base station may be sufficiently strong to be properly received by a target communication device. Otherwise, if the target communication device does not receive a sufficiently strong direct signal from the base station, the relay device may receive a wireless signal transmitted by the base station, and, in response to receiving the wireless signal from the base station, to transmit a further wireless signal to the communication device, the further signal being representative of the information contained in the signal received by the relay device from the base station. The central management may send control instructions to a plurality of relay-operable devices such that the plurality of relay-operable devices are each in the relay state, and such that if each of the relay-operable devices receives the same signal from a given communication device, such as the base station, each relay-operable device re-transmits the signal to another communication device, such as the target. So that the relay-operable device can perform at least some of the functions of a conventional cellular telephone, it may have: a user interface for converting sounds into audio data and vice versa, transmission circuitry for transmitting the audio data as a wireless data signal, and reception circuitry for receiving a wireless data signal and for producing corresponding audio data. The device will also preferably have a keypad, so that a user can key in data such as data indicative of the final intended destination of the wireless signals produced by the relay device. The user interface will preferably include a microphone so that a user can speak into the device, and a speaker, to enable to user to have a conversation using the device.

It will be appreciated that the wireless signals may represent images as well as sound, and that the user interface of the relay-operable device may be operable to convert images into data and vice versa as for other cellular communications devices, but for simplicity the invention will hereinafter be described in terms of wireless signals representative of sound.

The further wireless data signal transmitted by the device when operating as a relay may have a different format to the signal it receives, or it may be transmitted according to a different protocol. This may be necessary if, for example, the device from which the signal originates belongs to a different network provider to that responsible for the device or base station from which the signal originates. However, in a preferred embodiment, the communication device will be able to communicate directly with the base station when the communication device is within range of the base station, and so the further signal transmitted by the relay device will simply be a repeat of the received signal.

Preferably, the communication system will comprise a plurality of portable communication devices, at least some of which will be relay-operable. So that a wireless signal intended for the base station or a particular communication/relay device can be distinguished from signals intended for another destination, each wireless signal will preferably contain header information, the header information being indicative of the intended destination of the wireless signal. The header information may also include data indicative of the device from which the signal originates. In a packet system the header information can form part of a data packet, or be carried in signaling overhead on a switched digital system.

The or each relay-operable device will preferably have a processor which can read the header information in a wireless signal received by the device. If upon reading the header information the processor of a relay device determines that the relay device is the intended recipient of the wireless signal, the processor will preferably be programmed to allow the output interface to output the sound of which the wireless data signal is representative. The sound may be a ringing tone inviting the user of the relay device to accept a call, or if the call has already been accepted, the sound may be speech. A user of the relay device will thus be able to receive calls intended for that device in the same way as with a conventional cellular telephone.

Alternatively, if upon reading the header information the processor determines that the device is not the intended recipient of the wireless data signal, the processor will preferably pass an instruction to the reception circuitry and/or the user interface such that the information in the wireless signal is not reproduced at the user interface. Thus if the device relays a call, the call will be relayed silently without the user being aware, thereby making the relay device more attractive to a potential user.

In a preferred embodiment, the communication system has a central management system for controlling the state of the relay-operable devices on the basis of information accessed from a memory, means being provided for updating the information at time intervals, the information identifying which relay-operable devices, if any, are within the range of the base station and currently in their relay-operable state, and which communication devices (including any other relay-operable device. This will allow the central management to use the relay devices to relay wireless signals in a more efficient way.

A wireless signal initiated by a communication device can be relayed sequentially by a number of chosen relay-operable devices, the chosen relay-operable devices being chosen from a larger number of relay-operable devices which are able to receive the signal directly or indirectly, and wherein the relay-operable devices for relaying the signal, and the order in which the relay-operable devices relay the signal, being selected by the central management.

The memory accessed by the central management may also contain information indicating which relay devices, if any, are being used by a user in a conventional manner to make a call. This central management may then cause these relay devices to be in a non-relay state, to avoid the risk of overloading the processing capability of these relay devices.

If the communication system comprises a plurality of relay devices, a wireless signal initiated by a communication device may be relayed from one relay device to another relay device along a path. In this case, the management control may determine at least part of the path when or before the signal is initiated, in order to improve the efficiency of the system.

In particular, if a wireless signal initiated by a communication device can be relayed sequentially by a number of chosen relay devices, the chosen relay devices being chosen from a larger number of relay devices which are able to receive the data signal directly or indirectly, the relay devices for relaying the signal will preferably be selected by the central management, the order in which the relay devices relay the signal being chosen by the central management.

It will be appreciated that in some situations, only one path may be possible, and that it may not be possible to choose which relay devices are used to relay a signal.

In one embodiment, a relay device will be operable to automatically switch into a non-relay state when it is transmitting a wireless signal in response to a user input at the user interface (i.e., when the user is making a call). However, to simplify the fabrication of the relay device, the relay device will preferably be operable to relay a wireless signal whilst being used by the user to make a call. Since with existing cellular telephones the processing capacity is normally underused when a user makes a call, an existing cellular telephone can be modified to function as a relay device.

So that a user of a communication device can communicate with a large number of other users, the base station will preferably be connected to a main communication network such as a public telephone network, the main network having a plurality of nodes, at least some of the nodes having a plurality of communication terminals connected thereto.

In one embodiment, if a plurality of relay devices receive the signal from a communication device, the central management will send control instructions to the plurality of relay devices such that the relay devices are each in the relay state, and such that each of the relay devices transmits the signal from the communication device. In this way, the base station is more likely to receive the signal originating from the communication device, since it will be arriving from a plurality of directions, thereby benefiting from the multiple path effect.

In order to further improve the signal quality, the base station may have signal processing means for combining, averaging or otherwise processing the signals received from the plurality of relay devices.

BRIEF DESCRIPTION OF THE DRAWINGS

The invention will now be described, by way of example, with reference to the following drawings in which.

DETAILED DESCRIPTION OF EXEMPLARY EMBODIMENTS

Figure 1:
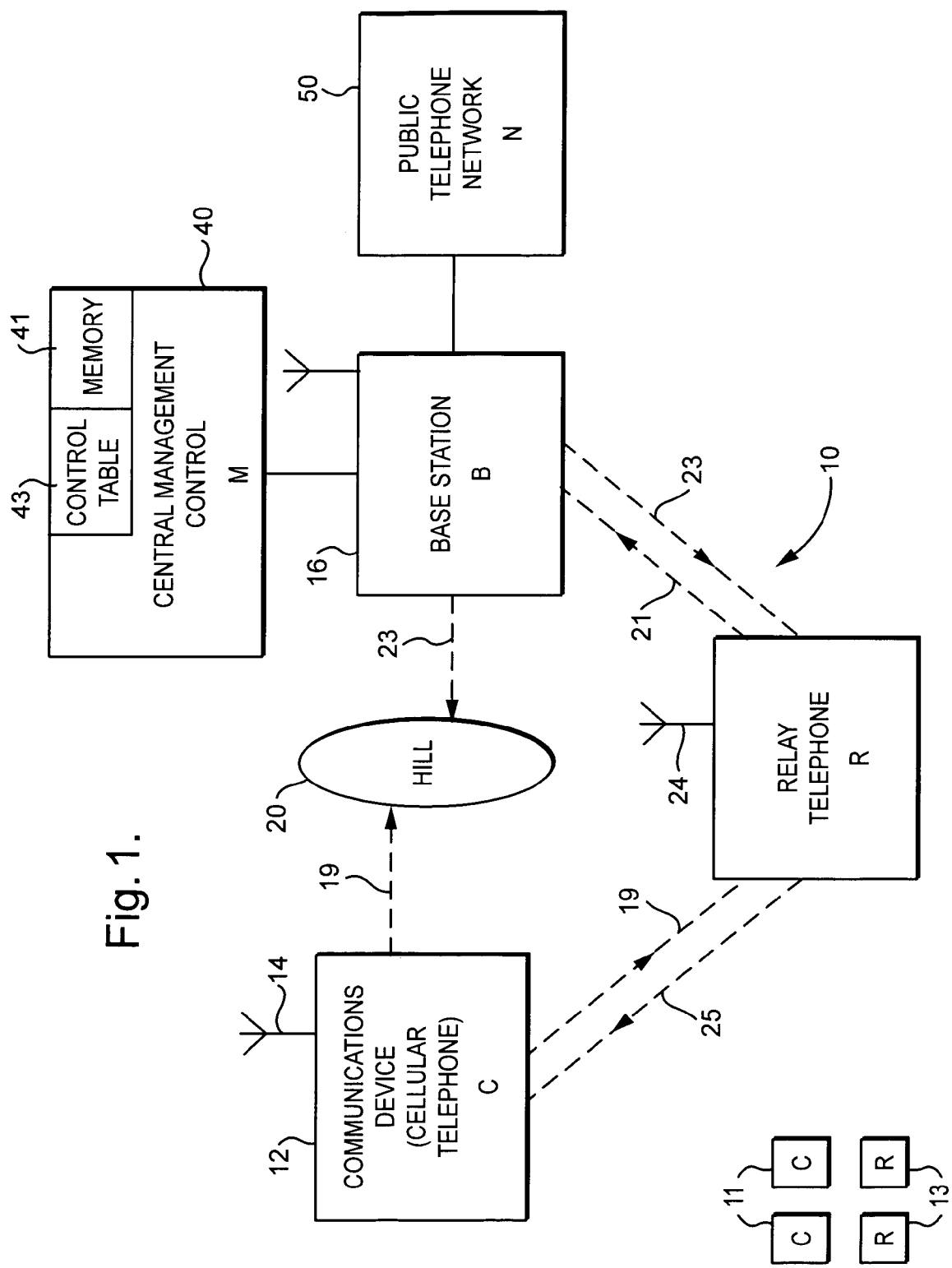
FIG. 1 is a schematic representation of an exemplary communication system incorporating a relay-operable device according to the invention.

In FIG. 1, there is shown a communication system 10 having a portable communication device (C), which in this example is a conventional cellular telephone 12. The cellular telephone 12 has an antenna 14 for sending and receiving radio signals containing digital data. A fixed base station (B) 16 is also provided, the base station having an antenna 18. An obstacle in the form of a hill 20 prevents a radio signal 19 emitted by the cellular telephone 12 from reaching the base station 16, with the result that the cellular telephone 12 is unable to directly communicate with the base station 16.

A portable relay telephone (R) 22 having an antenna 24 is located in a position where it is able to receive the radio signal 19 from the cellular telephone 12. The relay telephone 22 is able to retransmit to the base station 16 a further signal 21 which is a repeat of the signal 19 received from the cellular telephone, thereby allowing the cellular telephone to send information to the base station 16.

The base station 16 emits a signal 23 which in this example is also prevented by the hill 20 from reaching the cellular telephone 12 directly. However, the signal from the base station 16 is received by the relay telephone 22, and the relay telephone transmits the received signal 23 as a repeat signal 25, the repeat signal being in turn received by the cellular telephone 12. In this way, the relay telephone 22 acts as a two way repeater, enabling a two way exchange of radio signals 19,25 between the cellular telephone 12 and the base station 16. Thus in FIG. 1, the cellular telephone 12 communicates indirectly with the base station 16.

A plurality of further cellular telephones 11 and a plurality of further relay telephones 13 are also provided in the system 10, each of which is able to send/received radio signals.

The radio signals 19,21,23 transmitted by the cellular telephones 11,12, the relay telephones 13,22 and the base station 16 will include header information and payload information. The header information will be at least indicative of the origin of the radio signal and its intended destination.

Since the cellular telephones 11,12 and relay telephones 13,22 are portable, their location is likely to change from time to time. Therefore, the cellular telephones 11,12 and the relay telephones 13,22 each emit polling signals at intervals, polling signals indicating the identity of the device producing the polling signal. A central management control (M) 40 connected to the base station 16 is provided for monitoring the polling signals received by the base station 16 and for initiating control instructions to be sent to the relay telephone 22 by the base station 16. A memory 41 is provided within the management control 40 for storing a record of which relay telephones 11,12 and which cellular telephones 13,22 are within the area of coverage of the base station, this being determined on the basis of the polling signals received by the base station 16.

Figure 2:
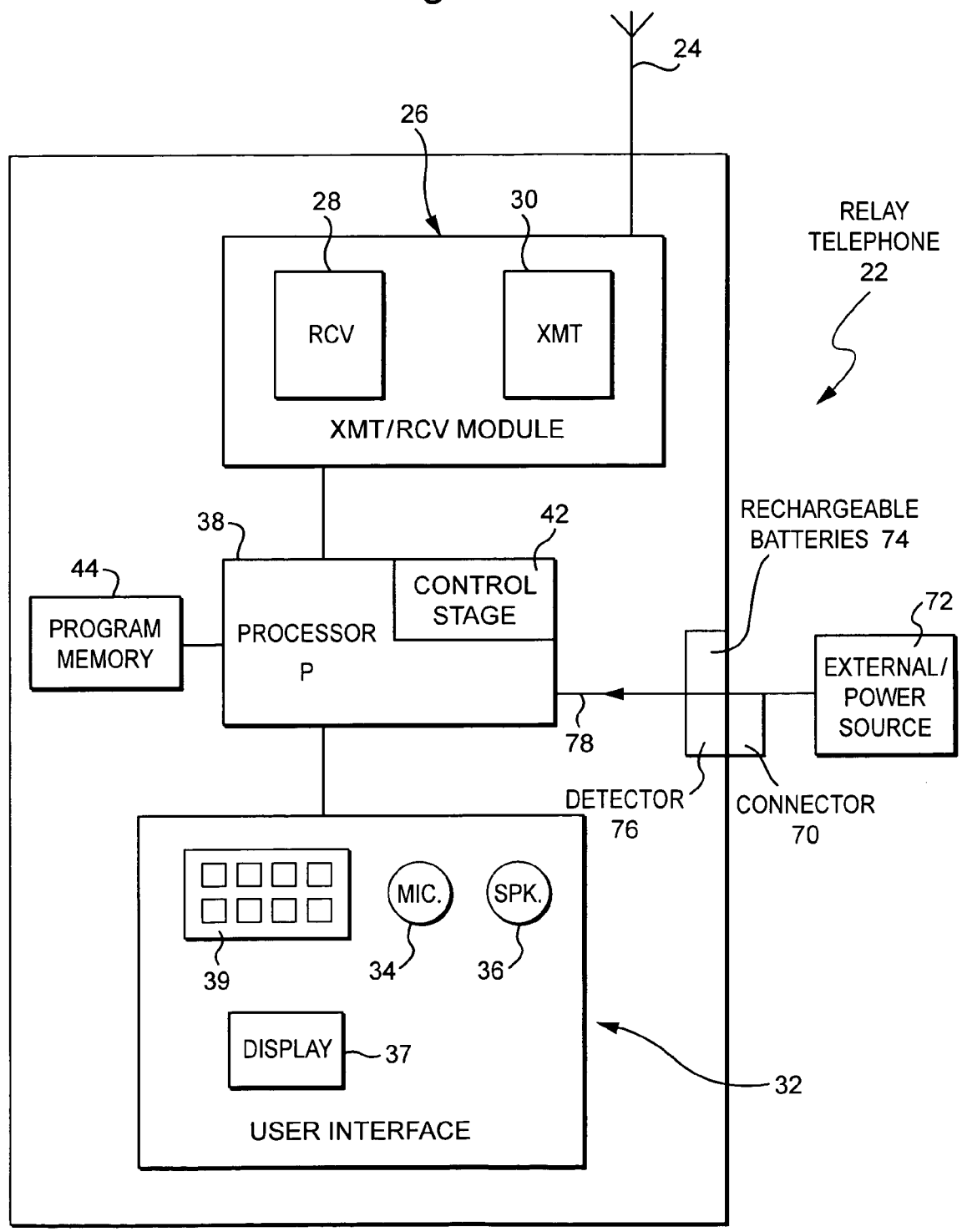
FIG. 2 is a schematic representation of an exemplary relay-operable telephone according to the invention, for use in the communication systems of FIG. 1.

With reference to FIG. 2, the relay telephone 22 has transmission/reception module 26 with reception circuitry 28 and transmission circuitry 30. A user interface 32 is provided for entering information into the relay telephone, the use interface having a microphone 34, a speaker 36, a key pad 39, and a display 37, allowing a user to use the relay telephone in a similar fashion to a conventional cellular telephone.

A processor (P) 38 connected to the transmission/reception module 26 and to the user interface 32 is provided. The processor has a control stage 42 therein to control the operation of the relay telephone 22, and in particular to control the operation of the reception/transmission module 26.

The relay telephone 22 may be in a non-relay state in which the transmission/reception module 26 does not transmit received signals. Alternatively, the relay telephone 22 may be in a relay state, in which the transmission/reception module 26 will transmit received signals. The processor 38 is operable to place the relay telephone 22 in the relay state in response to control signals from the base station 16. In the absence of control signals from the base station, the relay telephone can revert to the non-relay state.

The relay telephone has connecting means 70 (such as a plug or socket) for forming a releasable electrical connection to an external power source 72. Detecting means 76 are provided to detect when the external power source 72 is connected to the relay telephone 22. When the external power source 72 is connected, the detecting means 76 passes a connection signal 78 to the processor 38. In response to the connection signal 78, the processor 38 places the relay telephone 22 in a relay state. The processor 38 can be programmed (e.g., via program memory 44) such that it only permits the relay telephone to relay radio signals when the relay telephone is connected to the external power supply 72.

Rechargeable batteries 74 are provided for powering the relay telephone when the relay telephone 22 is being carried by a user, and in this example, the external power source is adapted to recharge the batteries 74 in situ when the external source is connected to the relay telephone 22.

When the relay telephone 22 receives a radio signal, the processor 38 reads the header information in the radio signal. If the header information indicates that the intended final destination of the radio signal is the relay telephone 22, the relay telephone will operate in the manner of a conventional cellular telephone. The payload information carried by the radio signal will be processed by the processor 38 and passed to the user interface 32 of the telephone, so that the user can hear a sound or view an image which the payload information represents.

If the header information in a radio signal received by the relay telephone 22 does not indicate that the relay telephone 22 is the final intended destination of the radio signal, the operation of the relay telephone will depend on whether it is in the relay state or the non-relay state. If the relay telephone is in the non-relay state, the processor will, having read the header information in the signal, ignore remainder of the radio signal. Alternatively, if the relay telephone is in the relay state, the processor 38 will instruct the transmission/reception module 26 to transmit a signal received by the relay telephone, so that the transmitted signal can be in turn received by the base station 16, as illustrated in FIG. 1. If necessary, the processor 38 may store the received signal temporarily in a memory 44 connected to the processor 38.

The management control 42 determines in part whether the relay telephone 22 is in the relay state, on the basis of factors such as the strength of polling signals from the relay telephone reaching the base station 16, and the number of other relay stations 13 that are within range of the base station 16. In particular, the management control may cause a relay telephone to be in a relay state if the relay telephone is not being used by a user to make a telephone call.

The relay telephone 22 will be operable to accept polling signals from another relay telephone 13 or another communication device 11,12. The processor 38 of the relay telephone 22 will keep and update a record of the polling signals received from the cellular telephone 11,13. This updated record will be transmitted to the base station 16 at time intervals and passed to the management control 40 (FIG. 1), thereby enabling the management control 40 to compile a control table 43 (FIG. 1) indicating which relay stations 13,22 are deemed able at a given moment to communicate with which the cellular telephones 11,12. The control table will be stored in the memory 41 so that it can be accessed. The table can then be used by the management control 40 in choosing, in dependence upon the intended destination of a radio signal, which relay telephone(s) is/are to be used to transmit the radio signal to or from the base station.

Control instructions governing which relay telephone 13,22 is to be used to transmit a radio signal emitted by the base station 16 can be included in the header of the emitted radio signal. Alternatively, the control instructions can be sent independently to the relay telephones 12,22, at irregular or regular time intervals.

In the example shown in FIG. 1, the control table 43 indicates that the relay telephone 22 can communicate with the cellular telephone 12. The radio signal 23 emitted by the base station 16 includes control instructions for the relay telephone 22 to repeat the signal 23, so that the signal 23 can reach the cellular telephone 12.

Figure 3:
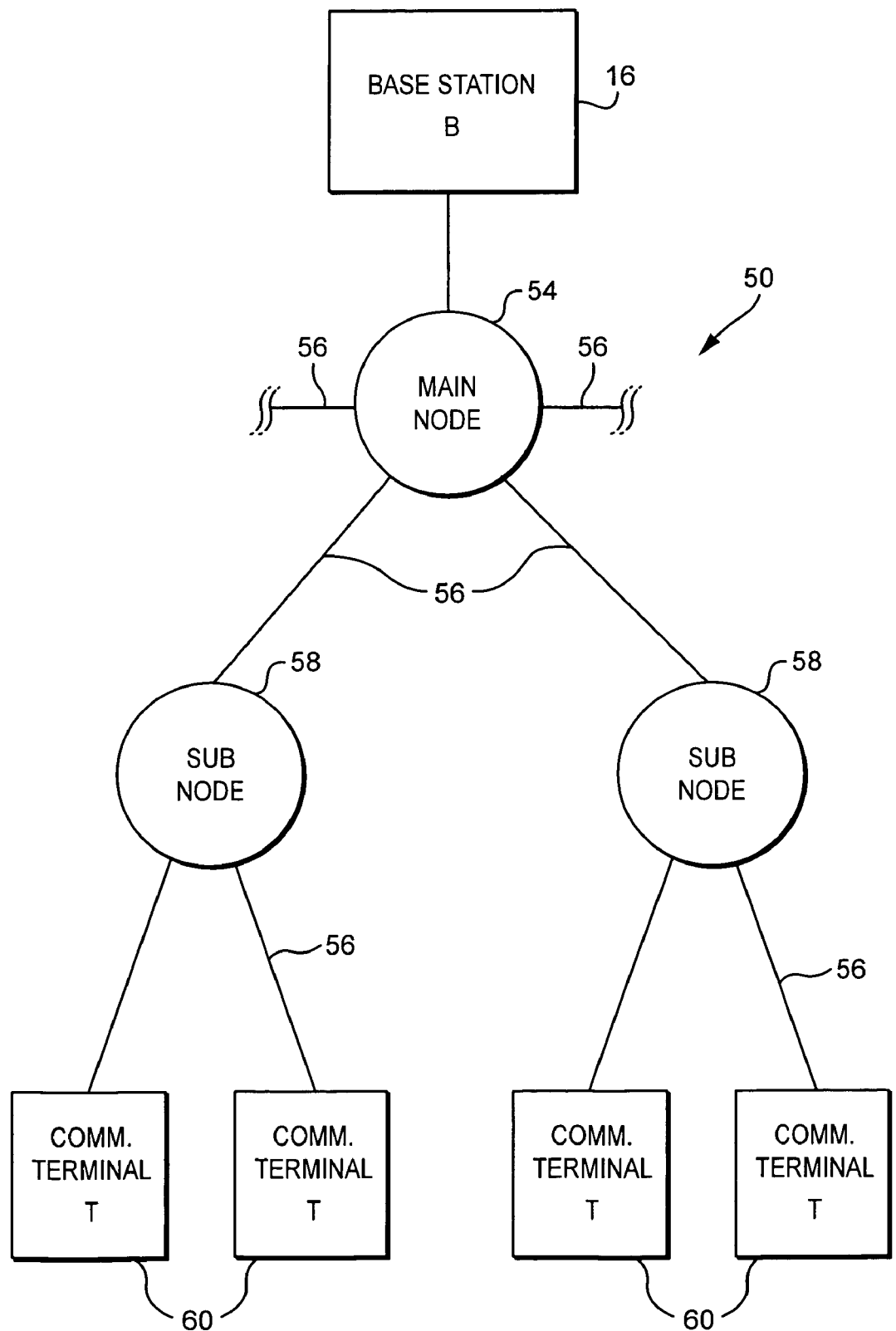
FIG. 3 is a simplified representation of an exemplary public telephone network with a base station.

The base station 16 is connected to a public telephone network (N) 50, as shown in FIG. 3. The telephone network has a hierarchical arrangement of nodes, including a main node 54, to which the base station 16 is connected. The main node 54 has links 56 to a plurality of other main nodes, (which are not shown here for clarity) as well as to a plurality of sub nodes 58, each sub node 58 being connected to a plurality of communication terminals (T) 60 via additional links 56. For simplicity only two stage of nodes are shown here, but it will be appreciated for example that each of the sub nodes 58 may have a plurality of further sub nodes connected thereto.

A radio signal emitted by a cellular telephone 11,12 or a relay telephone 13,22 will contain address information so that once the signal has been received by the base station 16, the signal can be routed by the main node 54 to one of the sub nodes 58, and subsequently routed by the sub node 58 to one of the terminals 60 in the network 50. In this example the links 56 are land lines, but some or all of the links 56 may be radio links.

It will be appreciated that the relay telephones of the present invention provide a simple way of increasing the access to a public telephone network from a cellular telephone without the need to erect more base stations. Since the relay telephones will perform the functions of conventional cellular telephones, the relay telephones are more likely to be carried by a user, thereby increasing the chance that a relay telephone will be appropriately located to relay a telephone call between another cellular telephone and a base station.

The invention claimed is:

1. A portable communication device for a communication system, the device being portable and being operable to transmit and receive wireless signals, said device comprising:
    means operable as a relay device to receive a wireless signal transmitted by a second communication device, and, in response to receiving the wireless signal, to transmit a further wireless signal to a third communication device, the further signal being representative of information contained in the signal received by the relay device from the second communication device, and
    control means arranged to determine by its own decision whether said device is to be permitted to operate in a relay-operable state, in which state it can relay wireless signals between second and third communication devices, said relay-operable state being permitted only when the device is connected to an external power source.

2. A communication device as in claim 1, wherein the device is powered by a rechargeable battery, and the external power supply is a battery charger.

3. A communication device as in claim 1, wherein the device also comprises:
a user interface for converting sounds into audio data and vice versa,
transmission circuitry for transmitting the audio data as a wireless signal, and
reception circuitry for receiving a wireless signal and for producing corresponding audio data.

4. A mobile telephone capable of being powered both by an internal power source and by an external power source and comprising:
relay means operable to cause the telephone to relay signals between a base station and another mobile telephone;
means to detect when the telephone is connected to an external power source and to generate by itself within the mobile telephone a connection signal when a connection to an external power source is detected, and
control means permitting operation of the relay means only if the connection signal is present.

5. A mobile telephone as in claim 4, in which the internal power source is a rechargeable battery, and the external power source serves also to recharge the battery.

6. A plurality of communication devices, at least one of which is operable as a relay device in accordance with claim 1, said devices being incorporated in a communication system comprising:
a base station, and
wherein a central management system associated with the base station controls the state of the relay device(s) on the basis of information accessed from a memory,
wherein the central management updates and information at time intervals, and
wherein said information identifies: (a) which relay devices, if any, are within the range of the base station and currently in their relay-operable state; and (b) which communication devices are within the range of each identified relay-operable device.

7. A communication system as in claim 6, wherein:
a wireless signal initiated by a communication device can be relayed sequentially by a number of chosen relay-operable devices, the chosen relay-operable devices being chosen from a larger number of relay-operable devices which are able to receive the signal directly or indirectly, and
the relay-operable devices for relaying the signal, and the order in which the relay-operable devices relay the signal, being selected by the central management.

8. A communication system as in claim 7, wherein the choice of relay devices and the order in which the relay devices relay a signal is determined by the central management before or when the wireless signal is initiated.

9. A communication system as in claim 6, wherein the base station is connected to a public telephone network.

10. A communication system as in claim 6, wherein:
the central management sends control instructions to a plurality of relay-operable devices such that a plurality of relay-operable devices are each in the relay state, and such that if each of the relay-operable devices in the relay state receives the same signal from a communication device, each such relay-operable device transmits the signal from the communication device.

11. A method for control of a portable communication device that can transmit and receive wireless signals, said method comprising:
controlling the device to operate as a relay device to receive a wireless signal transmitted by a second communication device, and, in response to receiving the wireless signal, to transmit a further wireless signal to a third communication device, the further signal being representative of information contained in the signal received by the relay device from the second communication device, and
determining by a local decision made within said device whether it is to be permitted to operate in a relay-operable state, in which state it can relay wireless signals between second and third communication devices, said relay-operable state being permitted only when the device is connected to an external power source.

12. A method as in claim 11 wherein the device is powered by a rechargeable battery, and the external power supply is a battery charger.

13. A method as in claim 11 wherein a user interface is provided for converting sounds into audio data and vice versa,
transmitting the audio data as a wireless signal, and
receiving a wireless signal and producing corresponding audio data.

14. A method of operating a mobile telephone capable of being powered both by an internal power source and by an external power source and capable of use to relay signals between a base station and another mobile telephone, said method comprising:
detecting when the telephone is connected to an external power source, and
determining by a local decision made within the mobile telephone that operation of the telephone as a relay will be permitted only when the external power source is connected.

15. A method as in claim 14 in which the internal power source is a rechargeable battery, and the external power source serves also to recharge the battery.

16. An operating a base station and a plurality of communication devices, at least one of which is operable as a relay device in accordance with claim 11, said devices being incorporated in a method for operating a communication system, said method comprising:
wherein a central management system associated with the base station controls the state of the relay device(s) on the basis of information accessed from a memory,
wherein the central management updates said information at time intervals, and
wherein said information identifies (a) which relay devices, if any, are within the range of the base station and currently in their relay-operable state; and (b) which communication devices are within the range of each identified relay-operable device.

17. A method as in claim 16 wherein:
a wireless signal initiated by a communication device can be relayed sequentially by a number of chosen relay-operable devices, the chosen relay-operable devices being chosen from a larger number of relay-operable devices which are able to receive the signal directly or indirectly, and
the relay-operable devices for relaying the signal, and the order in which the relay-operable devices relay the signal, being selected by the central management.

18. A method as in claim 17 wherein the choice of relay devices and the order in which the relay devices relay a signal is determined by the central management before or when the wireless signal is initiated.

19. A method as in claim 16 wherein the base station is connected to a public telephone network.

20. A method as in claim 16 wherein:
the central management sends control instructions to a plurality of relay-operable devices such that a plurality of relay-operable devices are each in the relay state, and such that if each of the relay-operable devices in the relay state receives the same signal from a communication device, each such relay-operable device transmits the signal from the communication device.

* * * * *